(12) United States Patent
Anderson

(10) Patent No.: US 8,989,946 B2
(45) Date of Patent: Mar. 24, 2015

(54) SYSTEM AND METHOD FOR AREA COVERAGE USING SECTOR DECOMPOSITION

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 331 days.

(21) Appl. No.: 13/411,999

(22) Filed: Mar. 5, 2012

(65) Prior Publication Data

US 2012/0166019 A1 Jun. 28, 2012

Related U.S. Application Data

(63) Continuation of application No. 12/640,845, filed on Dec. 17, 2009, now Pat. No. 8,224,516.

(51) Int. Cl.
*G01C 22/00* (2006.01)
*G05D 1/00* (2006.01)
*G05D 1/02* (2006.01)
*G06K 9/00* (2006.01)

(52) U.S. Cl.
CPC ............ *G05D 1/0274* (2013.01); *G05D 1/0219* (2013.01); *G05D 1/0227* (2013.01); *G05D 1/0246* (2013.01); *G05D 1/0251* (2013.01); *G05D 1/0255* (2013.01); *G05D 1/0259* (2013.01); *G05D 1/0265* (2013.01); *G05D 1/027* (2013.01); *G05D 1/0272* (2013.01); *G05D 2201/0208* (2013.01); *G05D 2201/0215* (2013.01); *G06K 9/00664* (2013.01)
USPC ....................... 701/25; 701/1; 701/23; 701/26

(58) Field of Classification Search
USPC ............. 701/1, 23, 25, 26, 28, 400, 408, 409, 701/410, 411
See application file for complete search history.

(56) References Cited

U.S. PATENT DOCUMENTS

| | | | |
|---|---|---|---|
| 3,789,198 A | 1/1974 | Henson et al. | |
| 4,647,784 A | 3/1987 | Stephens | |
| 4,675,048 A | 6/1987 | Maillet | |
| 4,700,301 A | 10/1987 | Dyke | |
| 4,818,107 A | 4/1989 | Ono et al. | |
| 4,823,138 A | 4/1989 | Shibano et al. | |
| 4,918,607 A | 4/1990 | Wible | |
| 5,005,128 A | 4/1991 | Robins et al. | |
| 5,016,173 A | 5/1991 | Kenet et al. | |

(Continued)

FOREIGN PATENT DOCUMENTS

EP 2336801 A2 6/2011

OTHER PUBLICATIONS

"Gradients, Linearity, and Sparsity," Solver Advanced Tutorial—Gradients, Linearity and Sparsity—Frontline Systems, pp. 1-2, [retrieved from Internet on Oct. 16, 2009], <http://www.solver.com/tutorialadv.htm>.

(Continued)

*Primary Examiner* — Bhavesh V Amin
(74) *Attorney, Agent, or Firm* — Yee & Associates, P.C.

(57) ABSTRACT

The different illustrative embodiments provide a method for generating an area coverage path plan using sector decomposition. A starting point is identified on a worksite map having a number of landmarks. A first landmark in the number of landmarks is identified. A path is generated around the first landmark until an obstacle is detected. In response to detecting the obstacle, the path is made linear to a next landmark. The path is generated around the next landmark.

13 Claims, 11 Drawing Sheets

(56) References Cited

U.S. PATENT DOCUMENTS

| | | | |
|---|---|---|---|
| 5,050,771 A | | 9/1991 | Hanson et al. |
| 5,051,906 A | | 9/1991 | Evans et al. |
| 5,056,612 A | * | 10/1991 | Roumagnac ............... 180/401 |
| 5,086,396 A | | 2/1992 | Waruszewski, Jr. |
| 5,109,340 A | * | 4/1992 | Kanayama ............... 701/25 |
| 5,144,685 A | | 9/1992 | Nasar et al. |
| 5,477,459 A | | 12/1995 | Clegg et al. |
| 5,585,626 A | | 12/1996 | Beck et al. |
| 5,684,476 A | * | 11/1997 | Anderson ............... 340/988 |
| 5,731,766 A | | 3/1998 | Akamatsu |
| 5,802,201 A | | 9/1998 | Nayar et al. |
| 5,850,469 A | | 12/1998 | Martin et al. |
| 5,892,462 A | | 4/1999 | Tran |
| 5,911,669 A | | 6/1999 | Stentz et al. |
| 5,955,973 A | * | 9/1999 | Anderson ............... 340/988 |
| 5,963,663 A | | 10/1999 | Tani |
| 5,995,902 A | | 11/1999 | Monson |
| 6,021,374 A | | 2/2000 | Wood |
| 6,085,147 A | | 7/2000 | Myers |
| 6,112,144 A | | 8/2000 | Allen |
| 6,128,574 A | * | 10/2000 | Diekhans ............... 701/410 |
| 6,191,813 B1 | | 2/2001 | Fujisaki et al. |
| 6,237,504 B1 | | 5/2001 | Tanahashi et al. |
| 6,255,793 B1 | | 7/2001 | Peless et al. |
| 6,317,690 B1 | | 11/2001 | Gia |
| 6,336,051 B1 | | 1/2002 | Pangels et al. |
| 6,370,453 B2 | | 4/2002 | Sommer |
| 6,374,048 B1 | | 4/2002 | Uenaka et al. |
| 6,401,038 B2 | | 6/2002 | Gia |
| 6,459,989 B1 | | 10/2002 | Kirkpatrick et al. |
| 6,539,303 B2 | | 3/2003 | McClure et al. |
| 6,556,598 B1 | | 4/2003 | Angott |
| 6,584,390 B2 | | 6/2003 | Beck |
| 6,615,570 B2 | | 9/2003 | Beck et al. |
| 6,678,588 B2 | | 1/2004 | He |
| 6,684,130 B2 | | 1/2004 | Ogure et al. |
| 6,700,482 B2 | | 3/2004 | Ververs et al. |
| 6,748,325 B1 | | 6/2004 | Fujisaki |
| 6,807,478 B2 | | 10/2004 | Giannopoulos et al. |
| 6,868,307 B2 | | 3/2005 | Song et al. |
| 6,907,336 B2 | | 6/2005 | Gray et al. |
| 6,934,615 B2 | * | 8/2005 | Flann et al. ............... 701/50 |
| 6,963,800 B1 | | 11/2005 | Milbert |
| 6,984,952 B2 | | 1/2006 | Peless et al. |
| 6,985,620 B2 | | 1/2006 | Sawhney et al. |
| 7,024,842 B2 | | 4/2006 | Hunt et al. |
| 7,079,943 B2 | * | 7/2006 | Flann et al. ............... 701/423 |
| 7,110,881 B2 | * | 9/2006 | Gray et al. ............... 701/25 |
| 7,142,956 B2 | | 11/2006 | Heiniger et al. |
| 7,155,309 B2 | | 12/2006 | Peless et al. |
| 7,164,118 B2 | | 1/2007 | Anderson et al. |
| 7,206,063 B2 | | 4/2007 | Anderson et al. |
| 7,216,033 B2 | * | 5/2007 | Flann et al. ............... 701/533 |
| 7,228,214 B2 | * | 6/2007 | Flann et al. ............... 701/50 |
| 7,242,791 B2 | | 7/2007 | Han et al. |
| 7,248,952 B2 | | 7/2007 | Ma et al. |
| 7,251,346 B2 | | 7/2007 | Higaki et al. |
| 7,272,467 B2 | | 9/2007 | Goncalves et al. |
| 7,277,792 B2 | * | 10/2007 | Overschie ............... 701/467 |
| 7,299,056 B2 | | 11/2007 | Anderson |
| 7,299,057 B2 | | 11/2007 | Anderson |
| 7,313,404 B2 | | 12/2007 | Anderson |
| 7,330,775 B2 | | 2/2008 | Orita et al. |
| 7,333,631 B2 | | 2/2008 | Roh et al. |
| 7,343,222 B2 | | 3/2008 | Solomon |
| 7,349,759 B2 | | 3/2008 | Peless et al. |
| 7,403,836 B2 | | 7/2008 | Aoyama |
| 7,429,843 B2 | | 9/2008 | Jones et al. |
| 7,447,593 B2 | | 11/2008 | Estkowski et al. |
| 7,505,848 B2 | | 3/2009 | Flann et al. |
| 7,613,544 B2 | | 11/2009 | Park et al. |
| 7,664,764 B2 | | 2/2010 | Biacs |
| 7,739,034 B2 | | 6/2010 | Farwell |
| 7,792,607 B2 | | 9/2010 | Han et al. |
| 7,826,969 B2 | | 11/2010 | Hein et al. |
| 7,831,094 B2 | | 11/2010 | Gupta et al. |
| 7,848,879 B2 | | 12/2010 | Herman |
| 7,916,898 B2 | | 3/2011 | Anderson |
| 8,116,950 B2 | | 2/2012 | Glee |
| 8,174,568 B2 | | 5/2012 | Samarasekera et al. |
| 8,224,516 B2 | * | 7/2012 | Anderson ............... 701/23 |
| 8,265,337 B2 | | 9/2012 | Yu et al. |
| 8,635,015 B2 | * | 1/2014 | Anderson ............... 701/400 |
| 2004/0158355 A1 | | 8/2004 | Holmqvist et al. |
| 2004/0193348 A1 | | 9/2004 | Gray et al. |
| 2004/0193349 A1 | * | 9/2004 | Flann et al. ............... 701/50 |
| 2005/0075784 A1 | * | 4/2005 | Gray et al. ............... 701/201 |
| 2005/0088643 A1 | | 4/2005 | Anderson |
| 2005/0171644 A1 | | 8/2005 | Tani |
| 2005/0192749 A1 | * | 9/2005 | Flann et al. ............... 701/301 |
| 2005/0197757 A1 | * | 9/2005 | Flann et al. ............... 701/50 |
| 2005/0197766 A1 | * | 9/2005 | Flann et al. ............... 701/202 |
| 2005/0216181 A1 | | 9/2005 | Estkowski et al. |
| 2005/0216182 A1 | | 9/2005 | Hussain et al. |
| 2005/0238200 A1 | | 10/2005 | Gupta et al. |
| 2005/0251291 A1 | | 11/2005 | Solomon |
| 2006/0091297 A1 | | 5/2006 | Anderson et al. |
| 2006/0126918 A1 | | 6/2006 | Oohashi et al. |
| 2007/0192024 A1 | | 8/2007 | Flann et al. |
| 2007/0219668 A1 | | 9/2007 | Takahashi et al. |
| 2008/0059015 A1 | | 3/2008 | Whittaker et al. |
| 2008/0167814 A1 | | 7/2008 | Samarasekera et al. |
| 2008/0194270 A1 | | 8/2008 | Greenberg |
| 2008/0262718 A1 | | 10/2008 | Farwell |
| 2009/0140926 A1 | | 6/2009 | Traster |
| 2010/0087992 A1 | | 4/2010 | Glee |
| 2011/0153072 A1 | | 6/2011 | Anderson |
| 2011/0153136 A1 | | 6/2011 | Anderson |
| 2011/0153338 A1 | | 6/2011 | Anderson |
| 2012/0283906 A1 | | 11/2012 | Anderson |

OTHER PUBLICATIONS

Anderson, System and Method for Area Coverage Using Sector Decomposition, U.S. Appl. No. 13/550,075, 63 pages.

European search report dated Apr. 11, 2011, regarding application No. EP10194541, reference 18885 EP Ho/VG, Applicant Deere & Company (5 Pages).

Yuan et al., "Active exploration using scheme of autonomous distribution for landmarks," IEEE International Conference on Robotics and Automation, May 2009, pp. 4169-4174.

Kiriy, "A Localization System for Autonomous Golf Course Mowers", McGill University Thesis for Electrical and Computer Engineering, Nov. 2002, pp. 1-122 www.cim.mcgill/ca/~kiriy/publications/MSthesisEK.pdf.

Rosenberg, "Boston University Partners in NSF Challenge to Create Next Generation Wireless network Using Visible Light", Boston University, Oct. 6, 2008, pp. 1-3.

Frontline Systems, Inc, "Gradients, Linearity, and Sparsity", Solver Advanced Tutorial—Gradients, Linearity and Sparsity—Frontline Systems, pp. 1-2, retrieved from internet on Oct. 16, 2009, http://www.solver.com/tutorialadv.htm.

* cited by examiner

SYSTEM AND METHOD FOR AREA COVERAGE USING SECTOR DECOMPOSITION

CLAIM OF PRIORITY

This application is a Continuation of and claims the benefit of priority to U.S. patent application Ser. No. 12/640,845, filed on Dec. 17, 2009 and entitled "System and Method for Area Coverage Using Sector Decomposition", contents of which are hereby incorporated by reference.

CROSS REFERENCE TO RELATED APPLICATIONS

This application is related to commonly assigned and co-pending U.S. patent application Ser. No. 12/640,937 filed on Dec. 17, 2009 and entitled "System and Method for Deploying Portable Landmarks"; U.S. patent application Ser. No. 12/640,953 filed on Dec. 17, 2009 and entitled "Enhanced Visual Landmark for Localization" all of which are hereby incorporated by reference.

FIELD OF THE INVENTION

The present invention relates generally to systems and methods for navigation and more particularly to systems and methods for mobile robotic navigation. Still more specifically, the present disclosure relates to a method and system for area coverage using sector decomposition.

BACKGROUND OF THE INVENTION

The use of robotic devices to perform physical tasks has increased in recent years. Mobile robotic devices can be used to perform a variety of different tasks. These mobile devices may operate in semi-autonomous or fully autonomous modes. Some robotic devices are constrained to operate in a contained area, using different methods to obtain coverage within the contained area. These robotic devices typically have an integrated, fixed positioning and navigation system. Mobile robotic devices often rely on dead reckoning or use of a global positioning system to achieve area coverage. These systems tend to be inefficient and are often cost-prohibitive.

SUMMARY

The different illustrative embodiments provide a method for generating an area coverage path plan using sector decomposition. A starting point is identified on a worksite map having a number of landmarks. A first landmark in the number of landmarks is identified. A path is generated around the first landmark until an obstacle is detected. In response to detecting the obstacle, the path is made linear to a next landmark. The path is generated around the next landmark.

The different illustrative embodiments further provide a method for executing an area coverage path plan using sector decomposition. An expected width of a landmark is determined in pixels for a desired distance away from the landmark. An image having the landmark is identified. An observed width of the landmark is determined using the image. The observed width of the landmark is compared to the expected width of the landmark. A message is sent to a vehicle control process to move an autonomous vehicle based on the comparison of the observed width and the expected width.

The different illustrative embodiments further provide a method for generating a worksite map using simultaneous localization and mapping. A worksite having a number of landmarks is identified. A worksite map is generated for the worksite. An area coverage task is initiated at the worksite. A landmark marked as unvisited is identified on the worksite map. A message is sent to a vehicle control process to proceed to the landmark marked as unvisited.

The features, functions, and advantages can be achieved independently in various embodiments of the present invention, or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
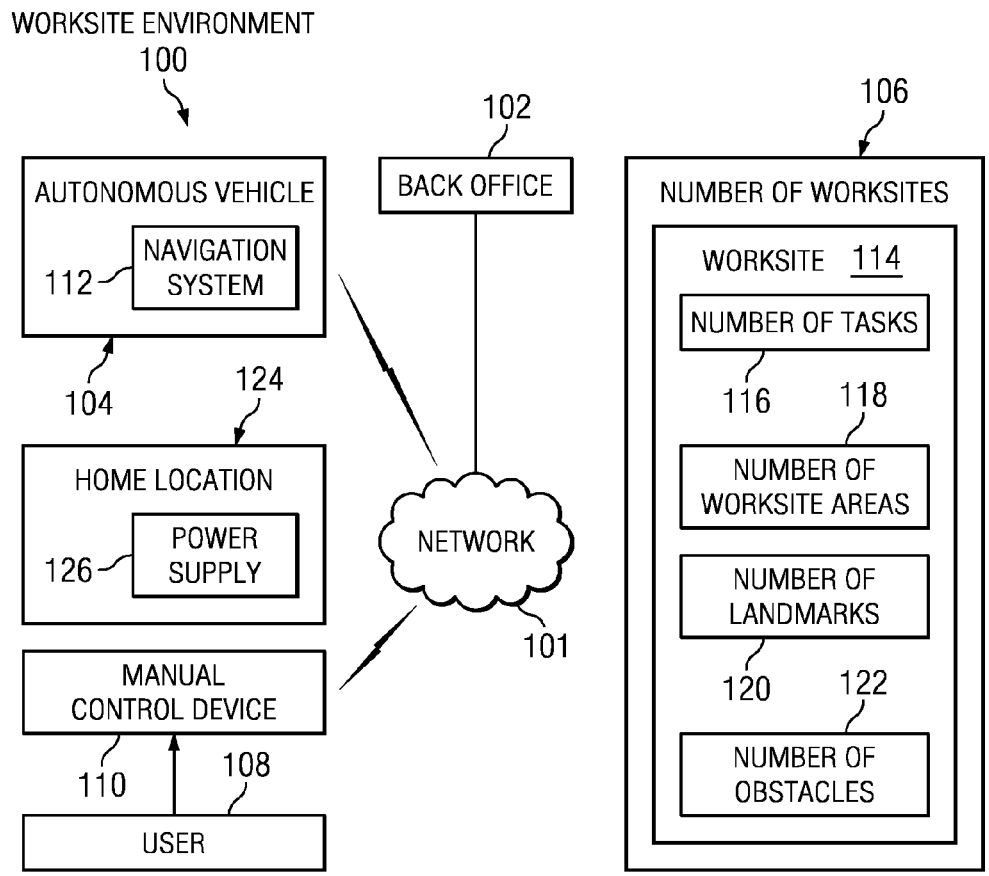
FIG. 1 is a block diagram of a worksite environment in which an illustrative embodiment may be implemented.

With reference to the figures and in particular with reference to FIG. 1, a block diagram of a worksite environment is depicted in which an illustrative embodiment may be implemented. Worksite environment 100 may be any type of worksite environment in which an autonomous vehicle can operate. In an illustrative example, worksite environment 100 may be a structure, building, worksite, area, yard, golf course, indoor environment, outdoor environment, different area, change in the needs of a user, and/or any other suitable worksite environment or combination of worksite environments.

As an illustrative example, a change in the needs of a user may include, without limitation, a user moving from an old location to a new location and operating an autonomous vehicle in the yard of the new location, which is different than the yard of the old location. As another illustrative example, a different area may include, without limitation, operating an autonomous vehicle in both an indoor environment and an outdoor environment, or operating an autonomous vehicle in a front yard and a back yard, for example.

Worksite environment 100 includes network 101 in one embodiment of the present invention. In this example, back office 102 may be a single computer or a distributed computing cloud. Back office 102 supports the physical databases and/or connections to external databases which may be used in the different illustrative embodiments. Back office 102 may supply databases to different vehicles, as well as provide online access to information from databases. Back office 102 may also provide path plans for vehicles, such as autonomous vehicle 104, for example. Worksite environment 100 may include autonomous vehicle 104, number of worksites 106, user 108, and manual control device 110. As used herein, a number of items means one or more items. For example, number of worksites 106 is one or more worksites.

Autonomous vehicle 104 may be any type of autonomous vehicle including, without limitation, a mobile robotic machine, a service robot, a field robot, a robotic mower, a robotic snow removal machine, a robotic leaf removal machine, a robotic lawn watering machine, a robotic vacuum, and/or any other autonomous vehicle. Autonomous vehicle 104 includes navigation system 112. Navigation system 112 provides a base system for controlling the mobility, positioning, and navigation for autonomous vehicle 104. Base system capabilities may include base behaviors such as, for example, without limitation, base mobility functions for effectuating random area coverage of a worksite, base obstacle avoidance functions for contact switch obstacle avoidance, base dead reckoning for positioning functions, and/or any other combination of basic functionality for autonomous vehicle 104.

Number of worksites 106 may be any area within worksite environment 100 in which autonomous vehicle 104 can operate. Each worksite in number of worksites 106 may be associated with a number of tasks. Worksite 114 is an illustrative example of one worksite in number of worksites 106. For example, in an illustrative embodiment, worksite 114 may be a back yard of a residence of a user. Worksite 114 includes number of tasks 116. In an illustrative example, number of tasks 116 may include mowing the back yard of the residence of a user. Autonomous vehicle 104 may operate to perform number of tasks 116 within worksite 114. As used herein, number refers to one or more items. In one illustrative example, number of worksites 106 may include, without limitation, a primary yard and a secondary yard. The primary yard may be worksite 114, associated with number of tasks 116. The secondary yard may be associated with another set of tasks, for example.

Each worksite in number of worksites 106 may include a number of worksite areas, a number of landmarks, and/or a number of obstacles. Worksite 114 includes number of worksite areas 118, number of landmarks 120, and number of obstacles 122. In an illustrative example, number of worksite areas 118 may be a number of locations within worksite 114, such as, for example, without limitation, a starting point, a midpoint, and an ending point. In another illustrative example, number of worksite areas 118 may include a sub-area of worksite 114.

Number of landmarks 120 may be any type of feature capable of being detected by autonomous vehicle 104 and used for identifying a location of a worksite. In an illustrative example, number of landmarks 120 may include, without limitation, cylindrical landmarks, colored landmarks, patterned landmarks, illuminated landmarks, vertical landmarks, natural landmarks, any combination of the foregoing, and/or any other suitable landmark. Patterned landmarks may include a visual pattern incorporated to provide distinctive information, for example. Illuminated landmarks may provide visual detection in low-light or no-light situations, such as night time, for example. Natural landmarks may include, for example, without limitation, tree trunks. Other types of landmarks may include, for example, building architectural features, driveways, sidewalks, curbs, fences, and/or any other suitable landmarks.

Number of obstacles 122 may be any type of object that occupies a physical space within worksite 114 and/or a location that autonomous vehicle 104 should not occupy or cross. The types of objects that occupy a physical space within worksite 114 may refer to objects that may be damaged by or cause damage to autonomous vehicle 104 if they were to contact each other, particularly with non-zero speed, for example. The locations which autonomous vehicle 104 should not occupy or should not cross may be independent of what occupies that space or is on the other side of the boundary, for example.

User 108 may be, without limitation, a human operator, a robotic operator, or some other external system. Manual control device 110 may be any type of manual controller, which allows user 108 to override autonomous behaviors and control autonomous vehicle 104. In an illustrative example, user 108 may use manual control device 110 to control movement of autonomous vehicle 104 from home location 124 to worksite 114 in order to perform number of tasks 116.

Home location 124 may be a docking station or storage station for autonomous vehicle 104. Home location 124 may include power supply 126. Power supply 126 may provide power to autonomous vehicle 104 when autonomous vehicle 104 is at home location 124. In an illustrative example, power supply 126 may recharge a power store or power supply of autonomous vehicle 104. Power supply 126 may include, without limitation, a battery, mobile battery recharger, ultra-capacitor, fuel cell, gas powered generator, photo cells, and/or any other suitable power source.

The illustration of worksite environment 100 in FIG. 1 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

The different illustrative embodiments recognize and take into account that currently used methods for robotic navigation often use a very primitive, random navigation system. This random navigation system works within a perimeter established by a wire carrying an electrical signal. The robotic machines in currently used methods may be equipped with an electrical signal detector and a bumper switch on the body of the machine. These machines move in a generally straight direction until they either detect the signal from the perimeter wire, or a bumper switch is closed due to contact of the machine with an external object. When either of these two situations occurs, these machines change direction. In this way, current methods constrain the machine within a work area perimeter and maintain movement after contact with external objects.

The different illustrative embodiments further recognize and take into account that currently used systems for robotic navigation are fixed systems integrated into a robotic machine. These fixed systems may include sensors for positioning and navigation, which allows for more efficient and precise coverage, but also increases the expense of the robotic machine by hundreds or thousands of dollars above the price of a robotic machine with basic, random navigation systems.

The different illustrative embodiments further recognize and take into account that currently used methods for robotic navigation raise concerns for consumers when considering whether to move from manned to unmanned machines. Consumers may wonder if the lower cost, yet random coverage ability of some machines will meet aesthetic standards for the machine task. Another concern may be the capability of a machine to work adequately in one environment over another environment. Still another concern may be continual technology updates and the cost of having to replace an entire machine when the fixed navigation systems in current machines become obsolete.

Thus, one or more of the different illustrative embodiments provide a method for generating an area coverage path plan using sector decomposition. A starting point is identified on a worksite map having a number of landmarks. A first landmark in the number of landmarks is identified. A path is generated around the first landmark until an obstacle is detected. In response to detecting the obstacle, the path is made linear to a next landmark. The path is generated around the next landmark.

The different illustrative embodiments further provide a method for executing an area coverage path plan using sector decomposition. An expected width of a landmark is determined in pixels for a desired distance away from the landmark. An image having the landmark is identified. An observed width of the landmark is determined using the image. The observed width of the landmark is compared to the expected width of the landmark. A message is sent to a vehicle control process to move an autonomous vehicle based on the comparison of the observed width and the expected width.

The different illustrative embodiments further provide a method for generating a worksite map using simultaneous localization and mapping. A worksite having a number of landmarks is identified. A worksite map is generated for the worksite. An area coverage task is initiated at the worksite. A landmark marked as unvisited is identified on the worksite map. A message is sent to a vehicle control process to proceed to the landmark marked as unvisited.

The different illustrative embodiments provide the ability to efficiently cover an area for an automated task without the high cost and environmental limitations of existing high precision localization systems. The different illustrative embodiments further provide the ability to cover an area with the excessive wear experienced by a semi-random area coverage method.

Figure 2:
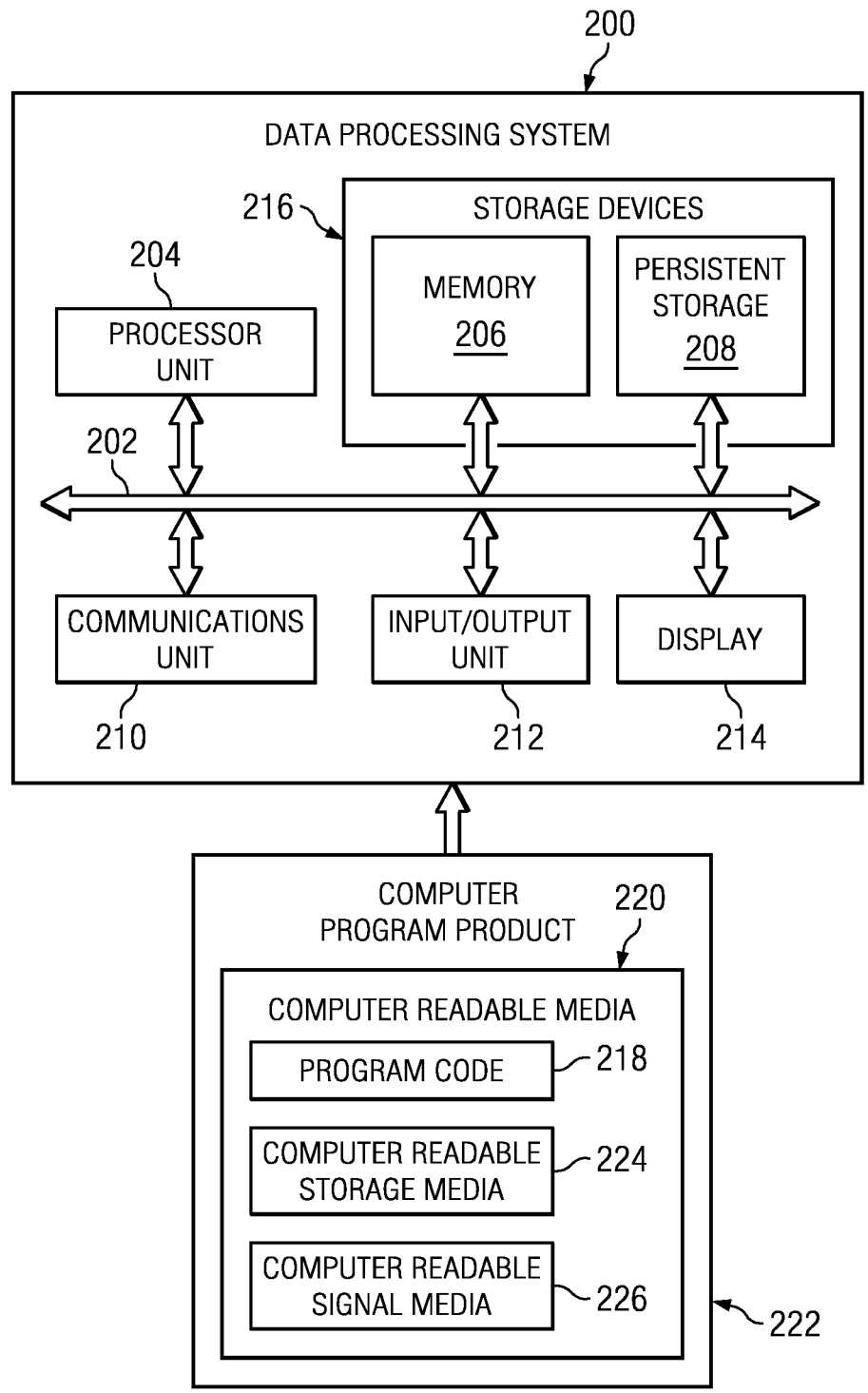
FIG. 2 is a block diagram of a data processing system in accordance with an illustrative embodiment.

With reference now to FIG. 2, a block diagram of a data processing system is depicted in accordance with an illustrative embodiment. Data processing system 200 is an example of a computer, such as back office 102 in FIG. 1, in which computer usable program code or instructions implementing the processes may be located for the illustrative embodiments.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

Figure 3:
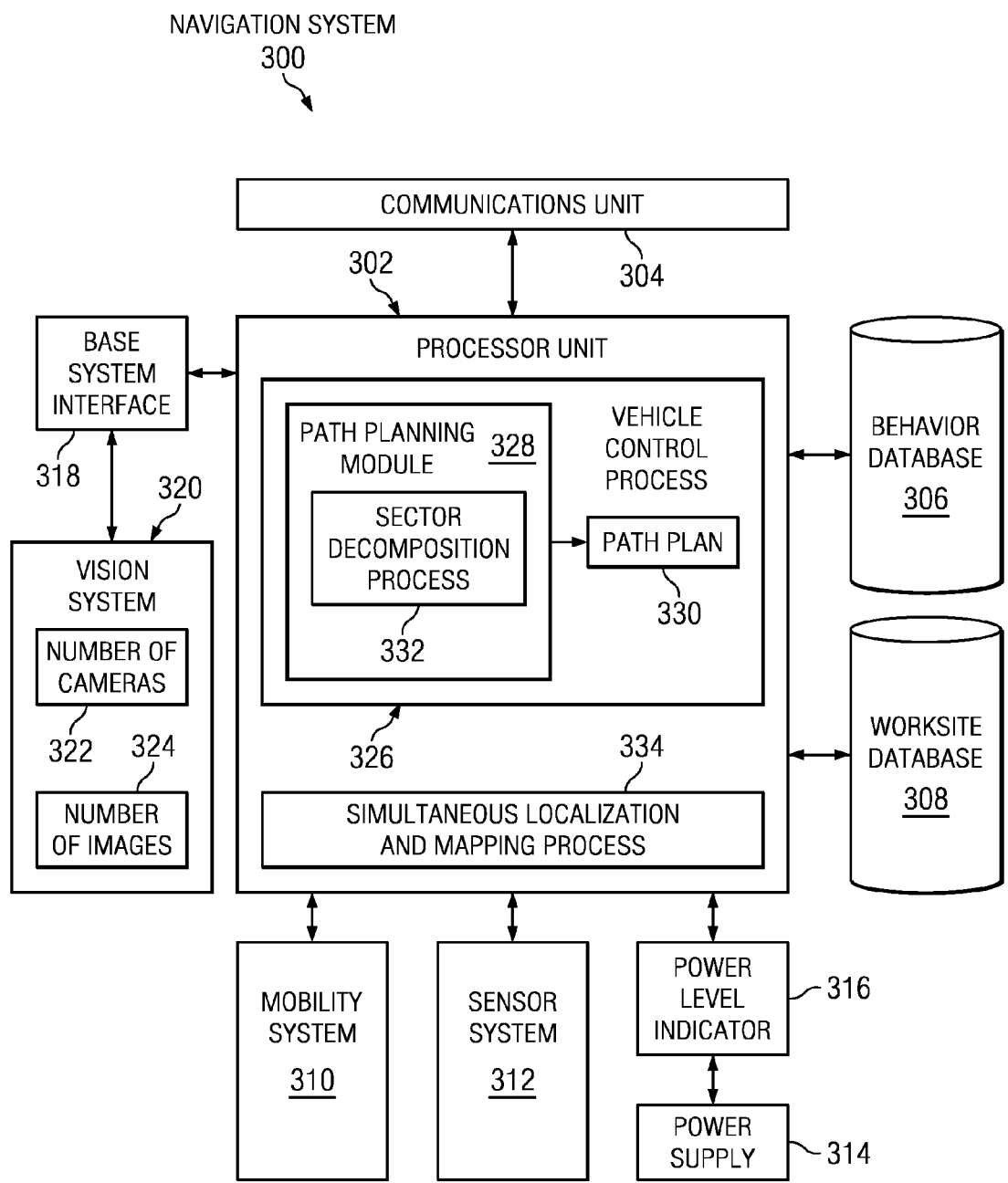
FIG. 3 is a block diagram of a navigation system in accordance with an illustrative embodiment.

With reference now to FIG. 3, a block diagram of a navigation system is depicted in accordance with an illustrative embodiment. Navigation system 300 is an example of one implementation of navigation system 112 in FIG. 1.

Navigation system 300 includes processor unit 302, communications unit 304, behavior database 306, worksite database 308, mobility system 310, sensor system 312, power supply 314, power level indicator 316, base system interface 318, and vision system 320. Vision system 320 includes number of cameras 322. Number of cameras 322 may include, for example, without limitation, a color camera, a black and white camera, a digital camera, an infrared camera, and/or any other suitable camera.

In one illustrative example, number of cameras 322 may be oriented to capture a view that is down and horizontal relative to the autonomous vehicle associated with navigation system 300, such as autonomous vehicle 104 in FIG. 1, for example. In this illustrative example, the orientation of number of cameras 322 may enable autonomous vehicle behaviors, such as boundary and/or perimeter following, for example, in addition to landmark identification and localization. In an illustrative example where number of cameras 322 includes a color camera, boundary following behaviors may use number of cameras 322 to identify a color boundary, such as green grass contrasted with a concrete curb, for example.

In another illustrative example, number of cameras 322 may be oriented to capture a view facing perpendicular to the direction of travel of the autonomous vehicle associated with navigation system 300, such as autonomous vehicle 104 in FIG. 1, for example. In yet another illustrative example, number of cameras 322 may be oriented to capture a view facing the landmark that the autonomous vehicle associated with navigation system 300 is traveling around, for example.

Vision system 320 operates to provide depth of field perception by providing number of images 324 from number of cameras 322, for enhanced vision capabilities of navigation system 300. Vision system 320 may be, for example, without limitation, a stereo vision system, an asymmetric vision system, a stadiametric ranging vision system, and/or any other suitable vision system. Number of cameras 322 may be used to capture number of images 324 of a worksite or worksite area, such as worksite 114 in FIG. 1, for example. Number of images 324 may be transferred over base system interface 318 to processor unit 302 for use in landmark identification and path planning, for example. As used herein, "number of" refers to one or more images.

Processor unit 302 may be an example of one implementation of data processing system 200 in FIG. 2. Processor unit 302 includes vehicle control process 326. Vehicle control process 326 is configured to communicate with and control mobility system 310. Vehicle control process 326 includes path planning module 328. Path planning module 328 may use information from behavior database 306 and worksite database 308, along with number of images 324 received from vision system 320, to generate path plan 330. Path planning module 328 may generate path plan 330 using sector decomposition process 332 to plan a path for a worksite, for example. A path may be any length, for example one foot or ten feet, and may change as the position of the autonomous vehicle relative to a landmark, obstacle, perimeter, and/or boundary changes. Sector decomposition process 332 is an area coverage algorithm, as shown in more illustrative detail in FIGS. 8 and 13. Sector decomposition process 332 may enable path planning module 328 and/or vehicle control process 326 to plan and execute path plan 330 with only one visible landmark at any given location of a worksite, for example. Sector decomposition process 332 generates paths which follow arcs at predefined distances from landmarks. The predefined distances may be, for example, without limitation, equal to the width of an autonomous vehicle, equal to the task coverage width for one pass of an autonomous vehicle, and/or any other specified distance. In one illustrative example, sector decomposition process 332 may generate paths with arcs that are progressively closer together as the autonomous vehicle proceeds further away from a landmark in order to compensate for site-specific error. Sector decomposition process 332 may also generate linear paths for point-to-point behaviors in order to move an autonomous vehicle from one landmark to another landmark, for example.

In an illustrative example, path planning module 328 may retrieve a worksite map from worksite database 308 in order to plan a path, such as path plan 330, for the worksite. A worksite map is a map that identifies a worksite, such as worksite 114 in FIG. 1, for example. A worksite map may be used to identify a location for an area coverage task and plan a path for execution of the area coverage task on a worksite. The worksite map may have a number of landmarks identified in this example. Vehicle control process 326 may use path plan 330 to send commands and/or signals to mobility system 310 in order to move an autonomous vehicle associated with navigation system 300 according to path plan 330. Vehicle control process 326 may initiate an area coverage task using path plan 330 in response to a trigger, such as, for example, without limitation, a button being selected on an autonomous vehicle, a command from a manual control device, a software-driven event, a time-driven event, and/or any other suitable trigger.

Figure 9:
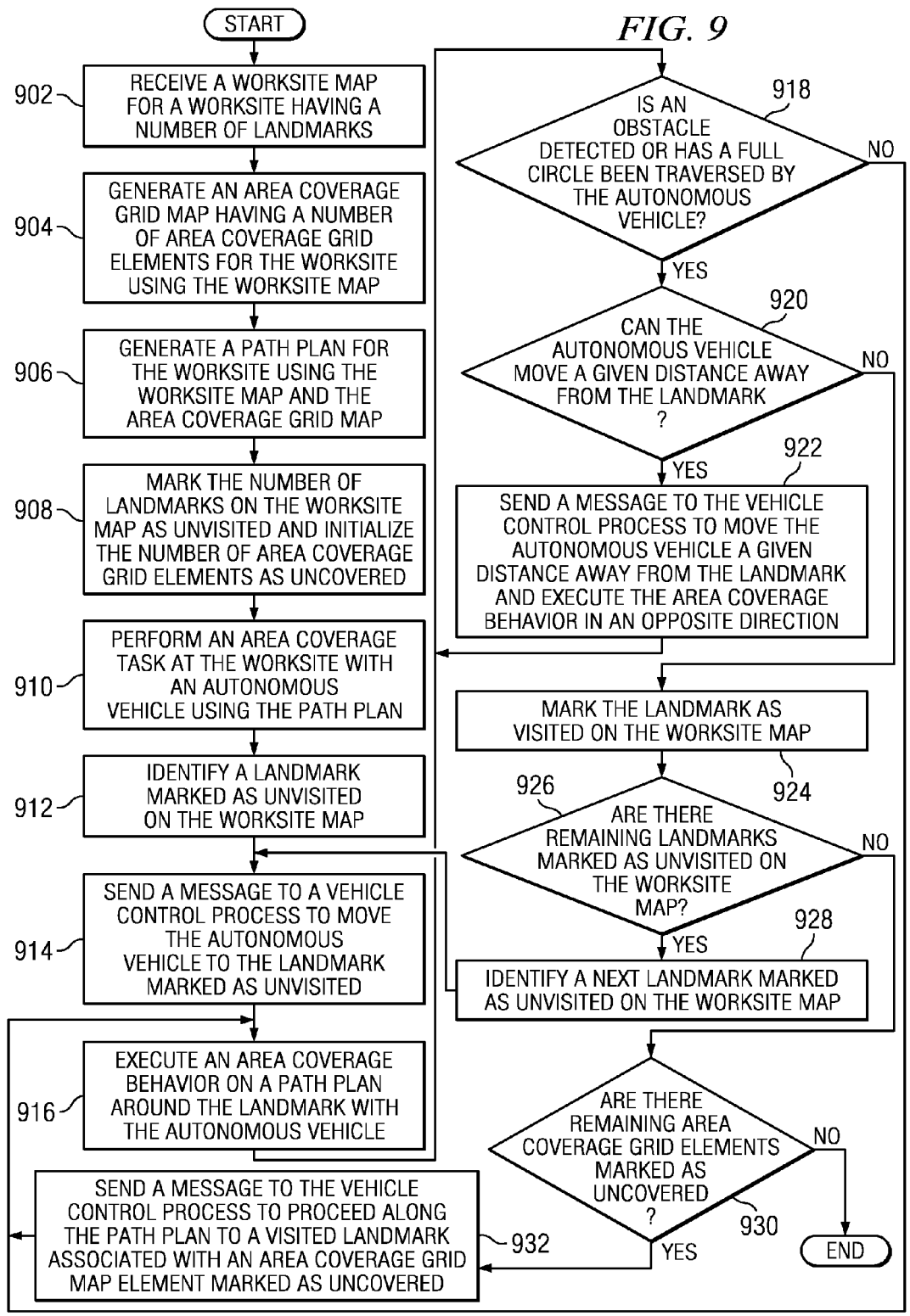
FIG. 9 is a flowchart illustrating a process for executing a path plan in accordance with an illustrative embodiment.
Figure 10:
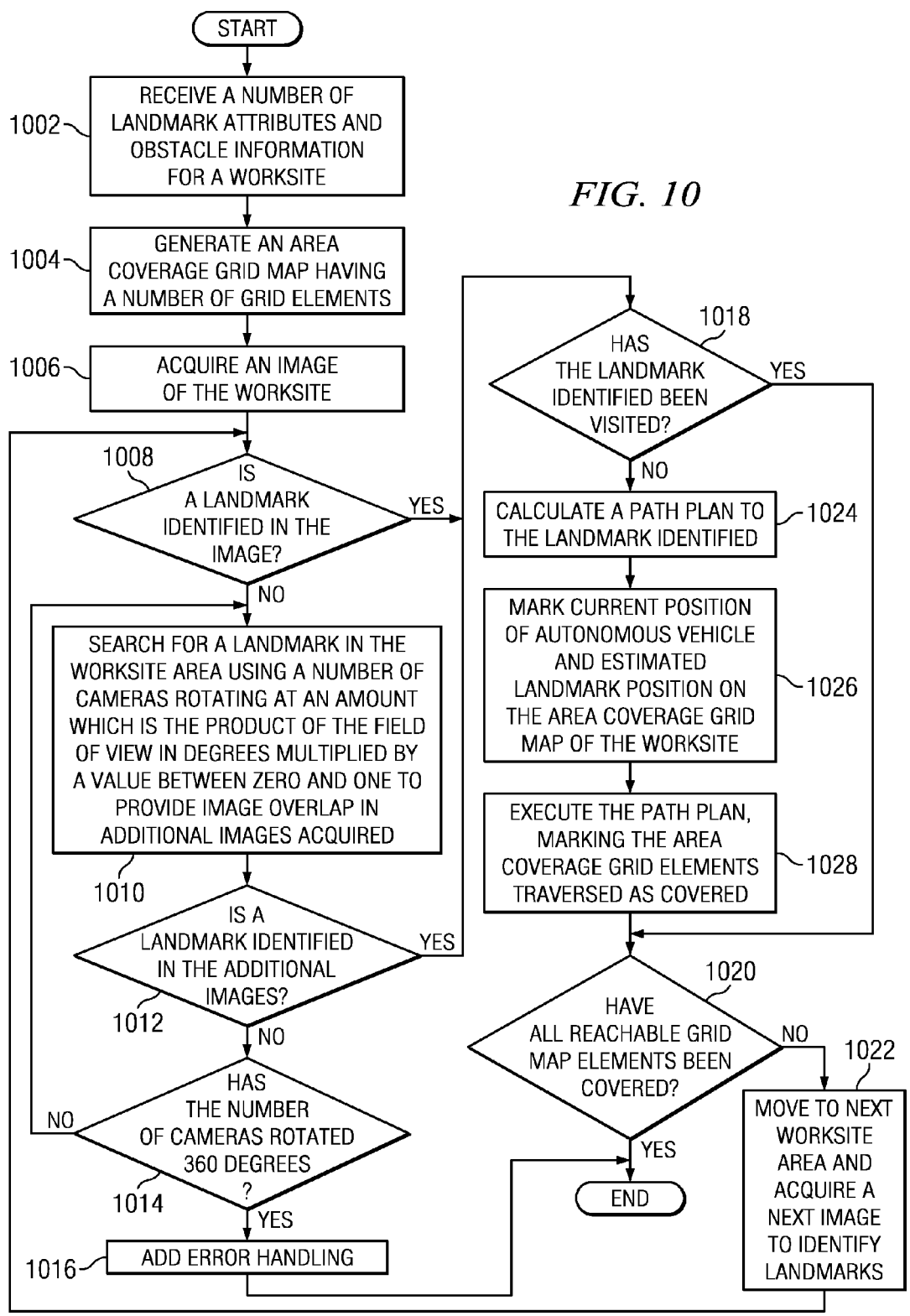
FIG. 10 is a flowchart illustrating a process for executing a path plan using simultaneous localization and mapping in accordance with an illustrative embodiment.

Processor unit 302 may also include simultaneous localization and mapping process 334, as shown in more illustrative detail in FIGS. 9 and 10. Simultaneous localization and mapping process 334 may generate a worksite map having a path plan, such as path plan 330, during operation of an area coverage task by the autonomous vehicle associated with navigation system 300, for example.

Processor unit 302 may further communicate with and access data stored in behavior database 306 and worksite database 308. Accessing data may include any process for storing, retrieving, and/or acting on data in behavior database 306 and/or worksite database 308. For example, accessing data may include, without limitation, using a lookup table housed in behavior database 306 and/or worksite database 308, running a query process using behavior database 306 and/or worksite database 308, and/or any other suitable process for accessing data stored in a database.

Processor unit 302 receives information from sensor system 312 and may use sensor information in conjunction with behavior data from behavior database 306 when controlling mobility system 310. Processor unit 302 may also receive control signals from an outside controller, such as manual control device 110 operated by user 108 in FIG. 1, for example. These control signals may be received by processor unit 302 using communications unit 304.

Communications unit 304 may provide communications links to processor unit 302 to receive information. This information includes, for example, data, commands, and/or instructions. Communications unit 304 may take various forms. For example, communications unit 304 may include a wireless communications system, such as a cellular phone system, a Wi-Fi wireless system, or some other suitable wireless communications system.

Communications unit 304 may also include a wired connection to an optional manual controller, such as manual control device 110 in FIG. 1, for example. Further, communications unit 304 also may include a communications port, such as, for example, a universal serial bus port, a serial interface, a parallel port interface, a network interface, or some other suitable port to provide a physical communications link. Communications unit 304 may be used to communicate with an external control device or user, for example.

In one illustrative example, processor unit 302 may receive control signals from manual control device 110 operated by user 108 in FIG. 1. These control signals may override autonomous behaviors of vehicle control process 326 and allow user 108 to stop, start, steer, and/or otherwise control the autonomous vehicle associated with navigation system 300.

Behavior database 306 contains a number of behavioral actions which vehicle control process 326 may utilize when controlling mobility system 310. Behavior database 306 may include, without limitation, basic vehicle behaviors, area coverage behaviors, perimeter behaviors, obstacle avoidance behaviors, manual control behaviors, power supply behaviors, and/or any other suitable behaviors for an autonomous vehicle.

Mobility system 310 provides mobility for an autonomous vehicle, such as autonomous vehicle 104 in FIG. 1. Mobility system 310 may take various forms. Mobility system 310 may include, for example, without limitation, a propulsion system, steering system, braking system, and mobility components. In these examples, mobility system 310 may receive commands from vehicle control process 326 and move an associated autonomous vehicle in response to those commands.

Sensor system 312 may include a number of sensor systems for collecting and transmitting sensor data to processor unit 302. For example, sensor system 312 may include, without limitation, a dead reckoning system, an obstacle detection system, a perimeter detection system, and/or some other suitable type of sensor system, as shown in more illustrative detail in FIG. 5. Sensor data is information collected by sensor system 312.

Power supply 314 provides power to components of navigation system 300 and the associated autonomous vehicle, such as autonomous vehicle 104 in FIG. 1, for example. Power supply 314 may include, without limitation, a battery, mobile battery recharger, ultracapacitor, fuel cell, gas powered generator, photo cells, and/or any other suitable power source. Power level indicator 316 monitors the level of power supply 314 and communicates the power supply level to processor unit 302. In an illustrative example, power level indicator 316 may send information about a low level of power in power supply 314. Processor unit 302 may access behavior database 306 to employ a behavioral action in response to the indication of a low power level, in this illustrative example. For example, without limitation, a behavioral action may be to cease operation of a task and seek a recharging station in response to the detection of a low power level.

Base system interface 318 provides power and data communications between vision system 320 and the other components of navigation system 300. In an illustrative example, number of images 324 may be transferred to processor unit 302 from vision system 320 using base system interface 318.

The illustration of navigation system 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in one advantageous embodiment, number of cameras 322 may comprise two cameras. The first camera may be sufficient to implement sector decomposition process 332, while the second camera provides additional capabilities to the autonomous vehicle associated with navigation system 300. In this illustrative example, the second camera may be used for operation in an extended range from a landmark. The maximum distance at which a landmark may be used by navigation system 300 may be a function of a maximum error specified for path following, camera resolution, camera field of view, and landmark width, for example. When vision system 320 of navigation system 300 is at the closest specified point to a landmark, the landmark may fill the image captured by the first camera. As vision system 320 is moved further away from the landmark by the autonomous vehicle associated with navigation system 300, edge errors from image acquisition increase as the edge becomes a larger percentage of the landmark width in the image. Adding a second camera with a narrower field of view than the first camera, in this illustrative example, may allow the landmark to occupy more of the processed image at a further distance from the landmark than the first camera allowed, minimizing edge errors, for example.

Figure 6:
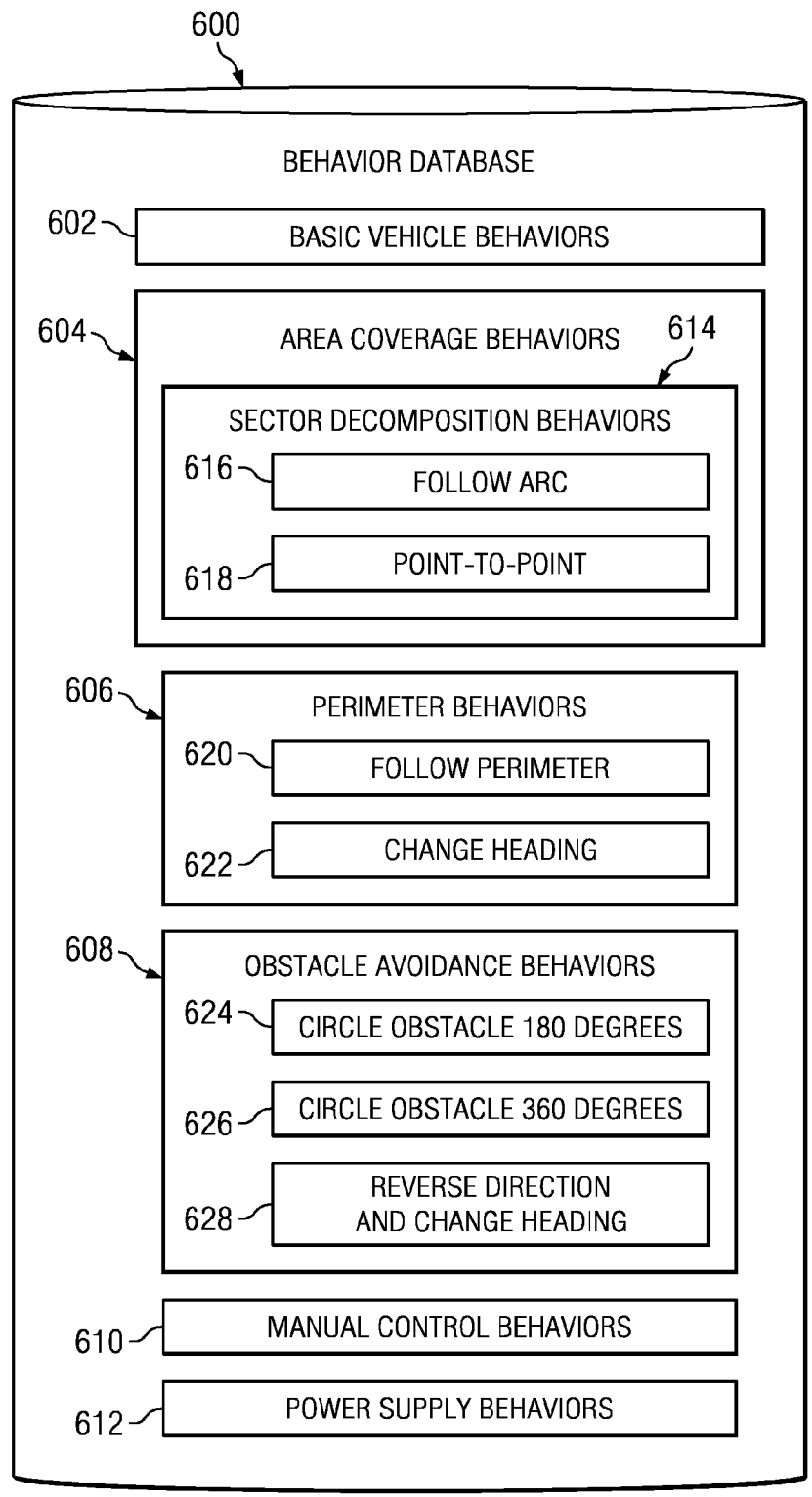
FIG. 6 is a block diagram of a behavior database in accordance with an illustrative embodiment.

In another illustrative example, an additional camera may be used for stereo vision behaviors, useful for behaviors such as circle obstacle 360 degrees 626 and circle obstacle 180 degrees 624 in FIG. 6, for example. In yet another illustrative example, an additional camera may be used to allow vision system 320 to capture number of images 324 on more than one side of an autonomous vehicle associated with navigation system 300. For example, number of cameras 322 may face views on opposite sides of the autonomous vehicle, providing simplified arc transitions without the need for the autonomous vehicle to position a single camera to continually face a landmark.

Any number of additional cameras may be added to number of cameras 322. As used herein, "number of cameras" refers to one or more cameras.

Figure 4:
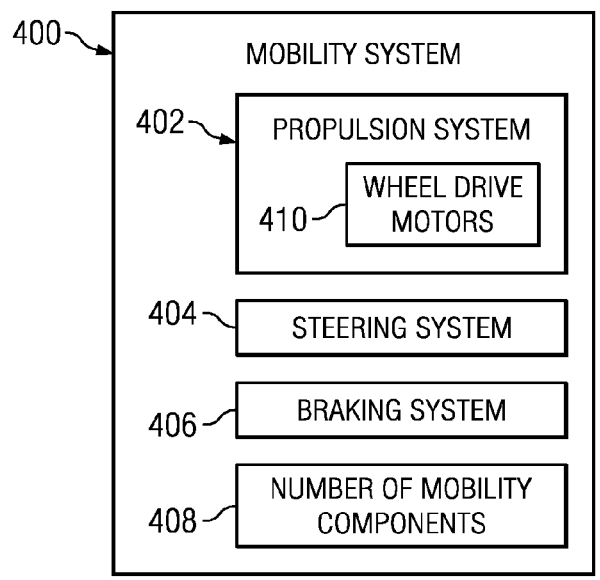
FIG. 4 is a block diagram of a mobility system in accordance with an illustrative embodiment.

With reference now to FIG. 4, a block diagram of a mobility system is depicted in accordance with an illustrative embodiment. Mobility system 400 is an example of one implementation of mobility system 310 in FIG. 3. Mobility system 400 provides mobility for autonomous vehicles associated with a navigation system, such as navigation system 300 in FIG. 3. Mobility system 400 may take various forms. Mobility system 400 may include, for example, without limitation, propulsion system 402, steering system 404, braking system 406, and number of mobility components 408. In these examples, propulsion system 402 may propel or move an autonomous vehicle, such as autonomous vehicle 104 in FIG. 1, in response to commands from a navigation system, such as navigation system 300 in FIG. 3.

Propulsion system 402 may maintain or increase the speed at which an autonomous vehicle moves in response to instructions received from a processor unit of a navigation system. Propulsion system 402 may be an electrically controlled propulsion system. Propulsion system 402 may be, for example, without limitation, an internal combustion engine, an internal combustion engine/electric hybrid system, an electric engine, or some other suitable propulsion system. In an illustrative example, propulsion system 402 may include wheel drive motors 410. Wheel drive motors 410 may be an electric motor incorporated into a mobility component, such as a wheel, that drives the mobility component directly. In one illustrative embodiment, steering may be accomplished by differentially controlling wheel drive motors 410.

Steering system 404 controls the direction or steering of an autonomous vehicle in response to commands received from a processor unit of a navigation system. Steering system 404 may be, for example, without limitation, an electrically controlled hydraulic steering system, an electrically driven rack and pinion steering system, a differential steering system, or some other suitable steering system. In an illustrative example, steering system 404 may include a dedicated wheel configured to control number of mobility components 408.

Braking system 406 may slow down and/or stop an autonomous vehicle in response to commands received from a processor unit of a navigation system. Braking system 406 may be an electrically controlled braking system. This braking system may be, for example, without limitation, a hydraulic braking system, a friction braking system, a regenerative braking system using wheel drive motors 410, or some other suitable braking system that may be electrically controlled. In one illustrative embodiment, a navigation system may receive commands from an external controller, such as manual control device 110 in FIG. 1, to activate an emergency stop. The navigation system may send commands to mobility system 400 to control braking system 406 to perform the emergency stop, in this illustrative example.

Number of mobility components 408 provides autonomous vehicles with the capability to move in a number of directions and/or locations in response to instructions received from a processor unit of a navigation system and executed by propulsion system 402, steering system 404, and braking system 406. Number of mobility components 408 may be, for example, without limitation, wheels, tracks, feet, rotors, propellers, wings, and/or other suitable components.

The illustration of mobility system 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
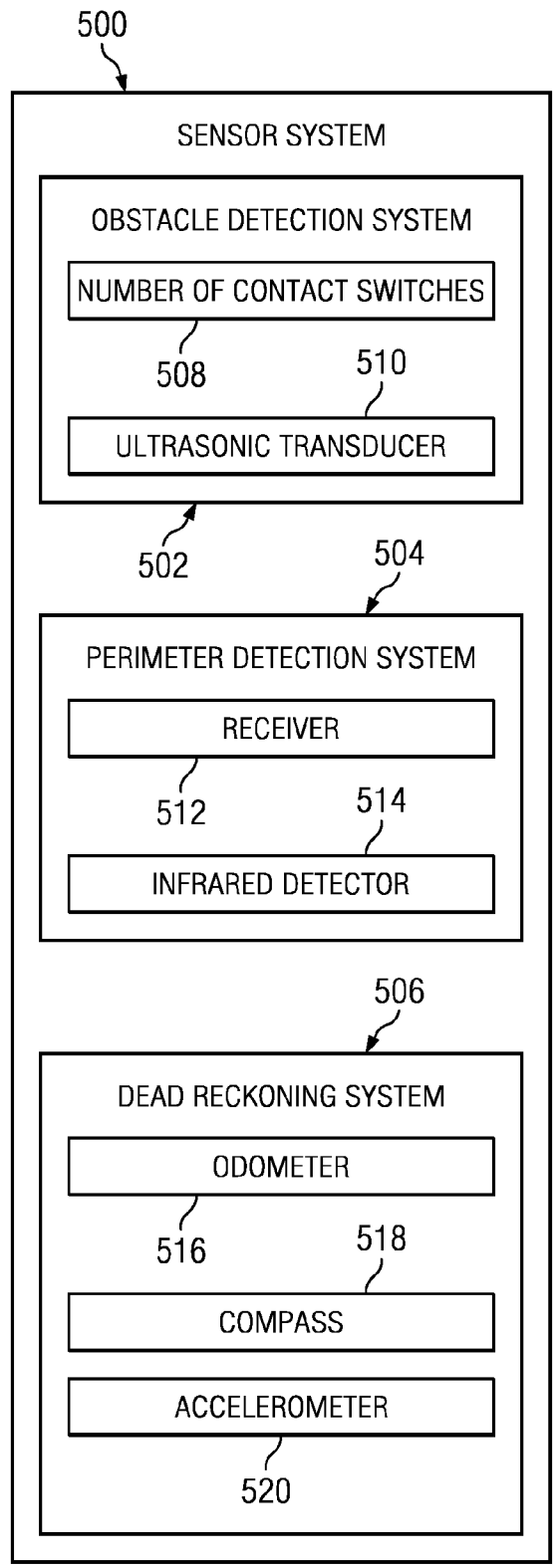
FIG. 5 is a block diagram of a sensor system in accordance with an illustrative embodiment.

With reference now to FIG. 5, a block diagram of a sensor system is depicted in accordance with an illustrative embodiment. Sensor system 500 is an example of one implementation of sensor system 312 in FIG. 3.

Sensor system 500 includes a number of sensor systems for collecting and transmitting sensor data to a processor unit of a navigation system, such as navigation system 300 in FIG. 3. Sensor system 500 includes obstacle detection system 502, perimeter detection system 504, and dead reckoning system 506.

Obstacle detection system 502 may include, without limitation, number of contact switches 508 and ultrasonic transducer 510. Number of contact switches 508 detects contact by an autonomous vehicle with an external object in the environment, such as worksite environment 100 in FIG. 1, for example. Number of contact switches 508 may include, for example, without limitation, bumper switches. Ultrasonic transducer 510 generates high frequency sound waves and evaluates the echo received back. Ultrasonic transducer 510 calculates the time interval between sending the signal, or high frequency sound waves, and receiving the echo to determine the distance to an object.

Perimeter detection system 504 detects a perimeter or boundary of a worksite, such as worksite 114 in FIG. 1, and sends information about the perimeter detection to a processor unit of a navigation system. Perimeter detection system 504 may include, without limitation, receiver 512 and infrared detector 514. Receiver 512 detects electrical signals, which may be emitted by a wire delineating the perimeter of a worksite, such as worksite 114 in FIG. 1, for example. Infrared detector 514 detects infrared light, which may be emitted by an infrared light source along the perimeter of a worksite, such as worksite 114 in FIG. 1, for example.

In an illustrative example, receiver 512 may detect an electrical signal from a perimeter wire, and send information about that detected signal to a processor unit of a navigation system, such as navigation system 300 in FIG. 3. The navigation system may then send commands to a mobility system, such as mobility system 400 in FIG. 4, to alter the direction or course of an autonomous vehicle associated with the navigation system, in this illustrative example.

Dead reckoning system 506 estimates the current position of an autonomous vehicle associated with the navigation system. Dead reckoning system 506 estimates the current position based on a previously determined position and information about the known or estimated speed over elapsed time and course. Dead reckoning system 506 may include, without limitation, odometer 516, compass 518, and accelerometer 520. Odometer 516 is an electronic or mechanical device used to indicate distance traveled by a machine, such as autonomous vehicle 104 in FIG. 1. Compass 518 is a device used to determine position or direction relative to the Earth's magnetic poles. Accelerometer 520 measures the acceleration it experiences relative to freefall.

The illustration of sensor system 500 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference now to FIG. 6, a block diagram of a behavior database is depicted in accordance with an illustrative embodiment. Behavior database 600 is an example of one implementation of behavior database 306 in FIG. 3.

Behavior database 600 includes a number of behavioral actions vehicle control process 326 of navigation system 300 may utilize when controlling mobility system 310 in FIG. 3. Behavior database 600 may include, without limitation, basic vehicle behaviors 602, area coverage behaviors 604, perimeter behaviors 606, obstacle avoidance behaviors 608, manual control behaviors 610, power supply behaviors 612, and/or any other suitable behaviors for an autonomous vehicle.

Basic vehicle behaviors 602 provide actions for a number of basic tasks an autonomous vehicle may perform. Basic vehicle behaviors 602 may include, without limitation, mowing, vacuuming, floor scrubbing, leaf removal, snow removal, watering, spraying, security, and/or any other suitable task.

Area coverage behaviors 604 provide actions for area coverage when performing basic vehicle behaviors 602. Area coverage behaviors 604 may include, without limitation, sector decomposition behaviors 614. Sector decomposition behaviors 614 may include, for example, without limitation, follow arc 616, point-to-point 618, and/or any other suitable behaviors.

Perimeter behaviors 606 provide actions for a navigation system in response to perimeter detection, such as by perimeter detection system 504 in FIG. 5. In an illustrative example, perimeter behaviors 606 may include, without limitation, follow perimeter 620, change heading 622, and/or any other suitable behaviors. Change heading 622 may operate to change the heading for an autonomous vehicle by a number of degrees in order to stay within a perimeter. Follow perimeter 620 may operate to move an autonomous vehicle parallel to a perimeter for a predefined distance. A predefined distance may be, for example, a distance equal to the width of the autonomous vehicle less an error amount.

Obstacle avoidance behaviors 608 provide actions for a navigation system to avoid collision with objects in an environment around an autonomous vehicle. In an illustrative example, obstacle avoidance behaviors 608 may include, without limitation, circle obstacle 180 degrees 624, circle obstacle 360 degrees 626, reverse direction and change heading 628, and/or any other suitable behaviors. Circle obstacle 180 degrees 624 may operate to direct an autonomous vehicle halfway around an obstacle to continue in a second direction opposite the first direction, for example. Circle obstacle 360 degrees 626 may operate to direct an autonomous vehicle around the entirety of an obstacle in order to perform a task on all areas around the obstacle, for example. Reverse direction and change heading 628 may operate to reverse direction and change heading of an autonomous vehicle to avoid an object detected by an obstacle detection system, such as obstacle detection system 502 in FIG. 5.

Manual control behaviors 610 provide actions for a navigation system to disable autonomy and take motion control from a user, such as user 108 in FIG. 1, for example. Power supply behaviors 612 provide actions for a navigation system to take a number of actions in response to a detected level of power in a power supply, such as power supply 314 in FIG. 3. In an illustrative example, power supply behaviors 612 may include, without limitation, stopping the task operation of an autonomous vehicle and seeking out additional power or power recharge for the autonomous vehicle.

The illustration of behavior database 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 7:
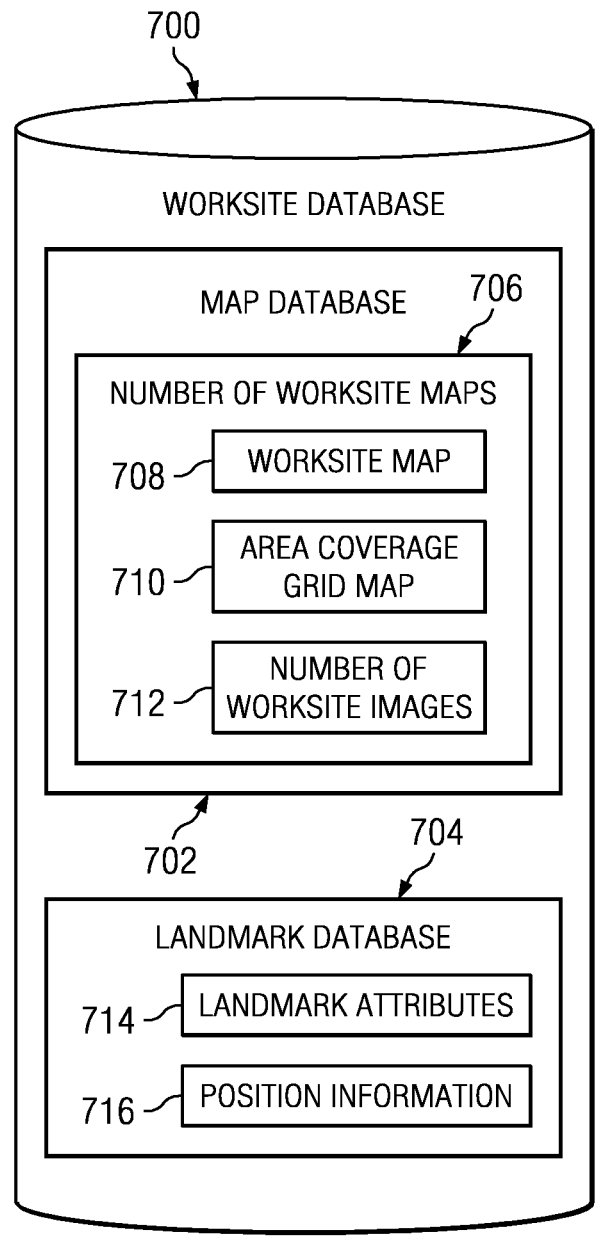
FIG. 7 is a block diagram of a worksite database in accordance with an illustrative embodiment.

With reference now to FIG. 7, a block diagram of a worksite database is depicted in accordance with an illustrative embodiment. Worksite database 700 is an example of one implementation of worksite database 308 in FIG. 3.

Worksite database 700 includes a number of databases processor unit 302 of navigation system 300 may utilize when planning a path and/or controlling mobility system 310 in FIG. 3. Worksite database 700 may include, without limitation, map database 702, landmark database 704, and/or any other suitable database of information for an autonomous vehicle.

Map database 702 includes number of worksite maps 706. Number of worksite maps 706 may correspond to number of worksites 106 in FIG. 1, for example. In one illustrative embodiment, number of worksite maps 706 may be loaded into map database 702 from a remote location, such as back office 102 in FIG. 1 using network 101. In another illustrative embodiment, number of worksite maps 706 may be stored in map database 702 after being generated by simultaneous localization and mapping process 334 in FIG. 3. In yet another illustrative embodiment, number of worksite maps 706 may be loaded into map database 702 by a user, such as user 108 in FIG. 1 over base system interface 318 and/or communications unit 304 in FIG. 3, for example. In an illustrative example, simultaneous localization and mapping process 334 in FIG. 3 may generate a worksite map during an initial operation in a worksite, and store the worksite map generated in map database 702 for later use in a future operation in the same worksite.

Number of worksite maps 706 may include, for example, without limitation, worksite map 708, area coverage grid map 710, number of worksite images 712, and/or any other suitable worksite map. Worksite map 708 may be an a priori map stored in number of worksite maps 706, which includes landmark locations and obstacle information for a worksite, such as worksite 114 in FIG. 1, for example. Worksite map 708 may be generated by a user, such as user 108 in FIG. 1 for example, identifying landmark locations and obstacles for a worksite on a map and/or image of the worksite. In an illustrative example, worksite map 708 may be used by autonomous vehicle 104 in FIG. 1 to plan an area coverage path for the worksite, taking into account the landmarks and obstacles for the worksite.

Area coverage grid map 710 may be, for example, without limitation, a worksite map including an area coverage grid overlay, a worksite image including an area coverage grid overlay, an area coverage grid for a bounded space and/or worksite dimensions, and/or any other suitable area coverage grid map. In an illustrative example, navigation system 300 in FIG. 3 may generate area coverage grid map 710 using worksite map 708 provided by user 108 in FIG. 1. In another illustrative example, navigation system 300 may generate area coverage grid map 710 using landmark attribute information and obstacle information received from a user, such as user 108 in FIG. 1. In yet another illustrative example, autonomous vehicle 104 in FIG. 1 may acquire number of worksite images 712 using a vision system, such as vision system 320 in FIG. 3, and generate area coverage grid map 710 using number of worksite images 712.

Landmark database 704 may include landmark attributes 714 and position information 716. Landmark attributes 714 may include, for example, without limitation, landmark images, landmark definitions, landmark characteristics, and/or any other suitable landmark attributes used to identify a number of landmarks in a worksite, such as number of landmarks 120 in worksite 114 in FIG. 1, for example. Landmark images may include stored images of a number of different types of landmarks, for example. Landmark definitions may refer to names and/or descriptions associated with a number of landmarks, for example. Landmark characteristics may include, for example, without limitation, shape, color, texture, and/or any other suitable characteristic for identifying a number of landmarks. Position information 716 identifies the position of a number of landmarks relative to locations within a worksite identified, such as worksite 114 in FIG. 1, for example. Position information 716 may be associated with number of worksite maps 706 stored in map database 702, for example.

The illustration of worksite database 700 in FIG. 7 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 8:
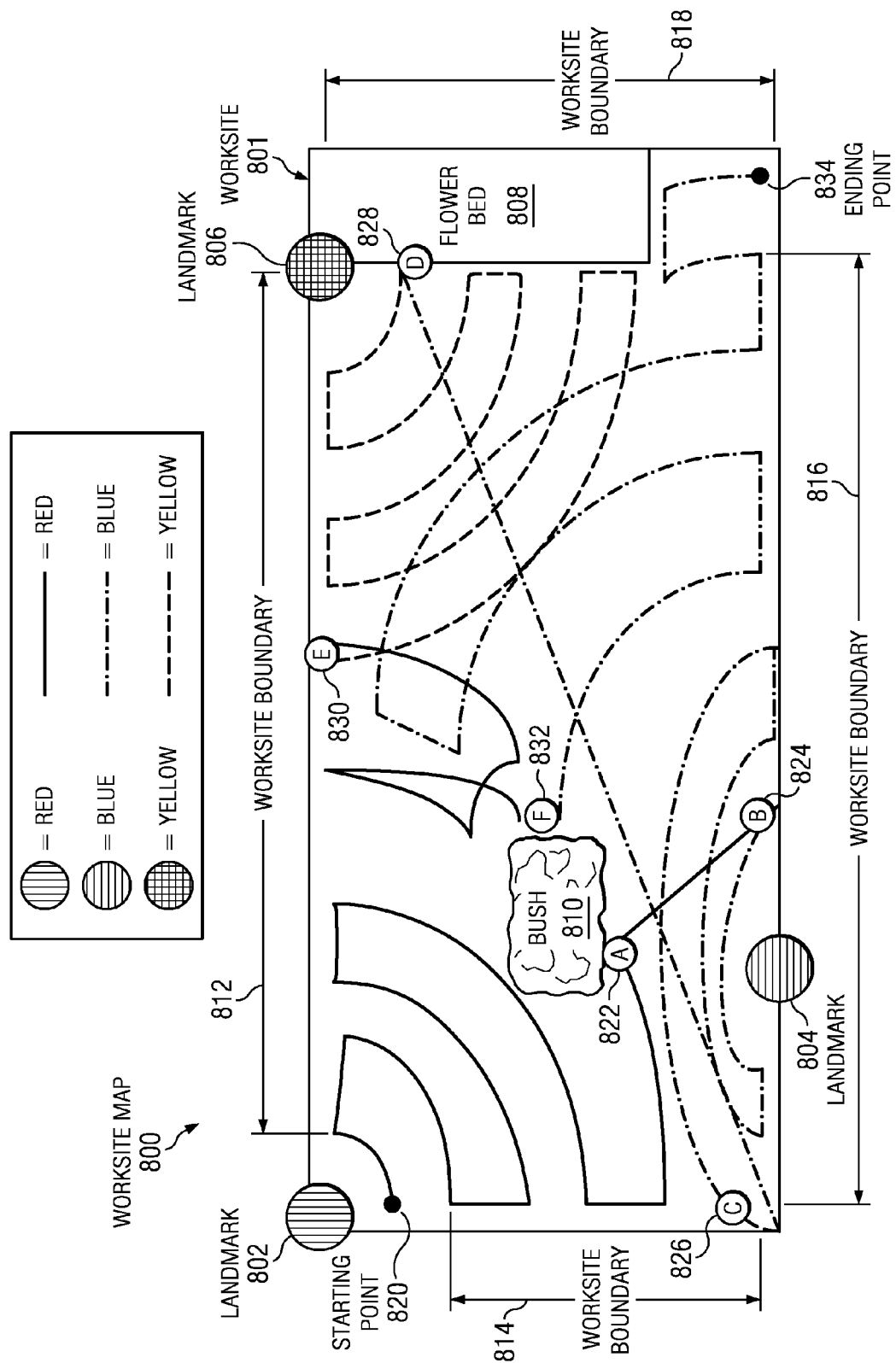
FIG. 8 is a block diagram of a worksite map in accordance with an illustrative embodiment.

With reference now to FIG. 8, a block diagram of a worksite map is depicted in accordance with an illustrative embodiment. Worksite map 800 may be an illustrative example of one implementation of number of worksite maps 706 in map database 702 of FIG. 7.

Worksite map 800 is generated for worksite 801. Worksite 801 may be an illustrative example of worksite 114 in FIG. 1. Worksite map 800 includes landmark 802, landmark 804, and landmark 806. Worksite map 800 also includes flower bed 808 and bush 810. In an illustrative example, flower bed 808 and bush 810 may be considered obstacles. Worksite map 800 is defined by a perimeter on each side of the worksite, specifically worksite boundary 812, worksite boundary 814, worksite boundary 816, and worksite boundary 818. A path plan may be generated for worksite map 800 using sector decomposition process 332 in FIG. 3, for example.

The path plan may begin with starting point 820. The path plan proceeds from starting point 820 around landmark 802 until it reaches worksite boundary 812. The path plan may maintain a predefined distance from landmark 802, creating an arc shaped path. The predefined distance may be, for example, without limitation, a width of the autonomous vehicle for which the path plan is being generated. Upon reaching worksite boundary 812, the path plan follows worksite boundary 812 away from landmark 802 for the predefined distance. The path plan then proceeds back around landmark 802 until it reaches worksite boundary 814. The path plan maintains the predefined distance from each preceding arc shaped path. Upon reaching a worksite boundary, the path follows the worksite boundary the predefined distance away from the preceding arc shaped path before turning and proceeding back around the landmark, such as landmark 802.

The path reaches an obstacle, in this example bush 810, at point A 822. The path is then made linear until it reaches worksite boundary 816 at point B 824. A next landmark is identified, in this example landmark 804. The path proceeds around landmark 804, in concentric rings, until it reaches point C 826. The path is then made linear until it reaches an obstacle or a worksite boundary, in this example flower bed 808 at point D 828. Landmark 806 is identified and the path proceeds around landmark 806 until it reaches point E 830. Point E 830 may be an illustrative example of a point reached where the autonomous vehicle following the path is at a distance from landmark 806 at which landmark 806 is no longer useful as a visual landmark. The distance may be such that the required accuracy of image detection by a vision system of the autonomous vehicle is not met, for example. The autonomous vehicle may then continue on a path around another landmark, even a previously visited landmark, which is at a closer distance than landmark 806, for example. At point E 830, the path again focuses on finishing a path around landmark 802 on the opposite side of bush 810, where it had previously left off to pursue a course around landmark 804. At point F 832, the path again focuses on finishing a path around landmark 804, where it had previously left off upon encountering the perimeter where worksite boundary 814 and worksite boundary 816 met and proceeding linearly to point D 828. As the autonomous vehicle moves within the worksite, area coverage grid map 710 in FIG. 7 is updated to reflect which grids have been covered. The path continues in concentric rings around landmark 804 until it reaches the end and there are no additional landmarks to visit and no additional area to cover for the worksite per area coverage grid map 710.

An autonomous vehicle, such as autonomous vehicle 104 in FIG. 1, may follow the path plan generated for worksite 801 using worksite map 800. The autonomous vehicle may start at starting point 820 identified in worksite map 800. This section of the path from starting point 820 around landmark 802 to worksite boundary 812 may be executed using a sector decomposition behavior, such as follow arc 616 in FIG. 6. When the autonomous vehicle reaches point A 822, the linear path to point B 824 may be executed using a sector decomposition behavior, such as point-to-point 618 in FIG. 6.

The illustration of worksite map 800 in FIG. 8 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference now to FIG. 9, a flowchart illustrating a process for executing a path plan is depicted in accordance with an illustrative embodiment. The process in FIG. 9 may be implemented by a component such as processor unit 302 of navigation system 300 in FIG. 3, for example.

The process begins by receiving a worksite map for a worksite having a number of landmarks (step 902). The number of landmarks may be positioned at the worksite so that at least one landmark is visible from any location of the worksite. The number of landmarks may be positioned at the worksite by, for example, without limitation, a human, a robot, autonomously, naturally, and/or any other suitable method of landmark placement.

In an illustrative example, the worksite map may be an initial map without a path plan, such as worksite map 708 in FIG. 7. The worksite map may be retrieved from a map database, such as map database 702 in FIG. 7, or received from a user or back office, for example. In one illustrative example, the worksite map may be an aerial image of the worksite in which obstacles, or boundaries, have been indicated by a user familiar with the worksite. The worksite map may also have marked locations of landmarks for the worksite and landmark attributes, such as diameter and color, marked by the user in this illustrative example.

The process generates an area coverage grid map having a number of area coverage grid elements for the worksite using the worksite map (step 904). The area coverage grid elements may be a number of sections of the area coverage grid map, for example. In one illustrative example, an area coverage grid map is generated from the worksite map, where the area coverage grid map represents the same region as the worksite map and is further divided into a grid. The size of each area coverage grid element may be predefined and/or selected by a user. For example, each area coverage grid element may be between one tenth and twice the size of the autonomous vehicle slated to perform the area coverage task in the worksite.

The process then generates a path plan for the worksite using the worksite map and the area coverage grid map (step 906). The process marks the number of landmarks on the worksite map as 'unvisited' and initializes the number of area coverage grid elements as 'uncovered' (step 908). In one illustrative example, the worksite map is initialized by setting all designated landmarks as unvisited and the area coverage grid map is initialized by setting all area coverage grid elements to zero. As the process proceeds, a landmark may be marked visited when all areas within a calculated distance of the landmark have been covered, for example. The calculated distance may be based on landmark size, vision system parameters, and/or a maximum acceptable distance error between an autonomous vehicle and the landmark, for example.

In one illustrative example, an area is considered covered if a percentage of grid elements in the area have a coverage value greater than a given threshold value. The coverage value is the value of an area coverage grid element. Starting from zero, the value is incremented by an amount each time the autonomous vehicle, or autonomous vehicle effecter, is shown to be positioned at the area coverage grid element until a value of at least one is achieved.

In one illustrative example, only zero or one values occur for coverage values, where zero indicates that the area coverage grid element is not covered and one indicates that the area coverage grid element is covered. In another illustrative example, error in autonomous vehicle localization may be considered in incrementing the area coverage grid elements. In this illustrative example, rather than setting the area coverage grid element at the current calculated autonomous vehicle position to one, a probability between zero and one is assigned to being at that location and a lower probability to adjacent area coverage grid elements. The current and adjacent area coverage grid elements are incremented by the probability of occupancy. The sum of this current probability of occupancies adds up to one, in this illustrative example.

Next, the process performs an area coverage task at the worksite with an autonomous vehicle using the path plan (step 910). The process identifies a landmark marked as unvisited on the worksite map (step 912). The process sends a message to a vehicle control process to move the autonomous vehicle to the landmark marked as unvisited (step 914).

The process executes an area coverage behavior on a path around the landmark with the autonomous vehicle (step 916). The area coverage grid map associated with the worksite, such as area coverage grid map 710 in FIG. 7, is updated based on each calculated current position of the autonomous vehicle used to execute the area coverage behavior. The process then determines whether an obstacle is detected or a full circle has been traversed by the autonomous vehicle (step 918). If a determination is made that an obstacle has not been detected or a full circle has not been traversed, the process returns to step 916.

If a determination is made that an obstacle has been detected or a full circle has been traversed, the process determines whether the autonomous vehicle can move a given distance away from the landmark (step 920). An autonomous vehicle may not be able to move the given distance away from the landmark due to an obstacle or because the calculated distance error exceeds a threshold value, for example. If a determination is made that the autonomous vehicle can move the given distance away from the landmark, the process sends a message to the vehicle control process to move the autonomous vehicle the given distance away from the landmark and execute the area coverage behavior in an opposite direction (step 922), with the process then returning to step 918. If a determination is made that the autonomous vehicle can not move the given distance away from the landmark, the process marks the landmark as 'visited' on the worksite map (step 924). The process then determines whether there are any remaining landmarks marked as 'unvisited' on the worksite map (step 926). If a determination is made that there are remaining landmarks marked as 'unvisited' on the worksite map, the process identifies a next landmark marked as 'unvisited' on the worksite map (step 928) and returns to step 914.

If a determination is made that there are no remaining landmarks marked as 'unvisited' on the worksite map, the process then determines whether there are any remaining area coverage grid elements marked as 'uncovered' (step 930). If a determination is made that there are remaining area coverage grid elements marked as 'uncovered', the process sends a message to the vehicle control process to proceed along the path plan to a visited landmark associated with an area coverage grid element marked as uncovered (step 932), and then returns to step 916. If a determination is made that there are no remaining area coverage grid elements marked as 'uncovered', the process terminates thereafter.

With reference now to FIG. 10, a flowchart illustrating a process for executing a path plan using simultaneous localization and mapping is depicted in accordance with an illustrative embodiment. The process in FIG. 10 may be implemented by a component such as simultaneous localization and mapping process 334 in FIG. 3, for example.

The process begins by receiving a number of landmark attributes and obstacle information for a worksite (step 1002) The landmark attributes may be, for example, without limitation, landmark descriptions, images, characteristics, and/or any other suitable attribute. In one illustrative example, the number of landmark attributes may identify landmarks as cylinders with a given diameter and colors red, white, and blue.

The process generates an area coverage grid map having a number of grid elements (step 1004). The process then acquires an image of the worksite (step 1006). The image may be acquired using a vision system, such as vision system 320 in FIG. 3 using number of cameras 322, for example. The process determines whether a landmark is identified in the image (step 1008).

If a determination is made that that a landmark is not identified in the image, the process searches for a landmark in the worksite area using a number of cameras rotating at an amount which is the product of the field of view in degrees multiplied by a value between zero and one to provide image overlap in additional images acquired (step 1010). The process then determines whether a landmark is identified in the additional images acquired (step 1012). If a determination is made that a landmark is not identified in the additional images, the process determines whether the number of cameras have rotated 360 degrees (step 1014). If a determination is made that the number of cameras have rotated 360 degrees, the process adds error handling (step 1016), and terminates thereafter. Error handling refers to the landmark rule, which is that at least one landmark is always in view from all workable portions of a worksite. If at least one landmark cannot be found, the rule is broken, and the process terminates.

If a determination is made that the number of cameras have not rotated 360 degrees, the process returns to step 1010. If a determination is made that a landmark is identified in the image in step 1008 or if a determination is made that a landmark is identified in the additional images in step 1012, the process then determines if the landmark identified has been visited (step 1018). If a landmark has been visited, the area coverage grid map will be marked with a 'visited' landmark previously identified.

If a determination is made that the landmark identified has been visited, the process determines whether all grid map elements have been covered (step 1020). When a grid map element is covered, it will be marked as 'covered' on the area coverage grid map. If there are areas of the area coverage grid map marked as 'uncovered' then there are remaining reachable grid map elements to cover. If a determination is made that all grid map elements have been covered, the process terminates thereafter.

If a determination is made that all grid map elements have not been covered, the process moves to a next worksite area and acquires a next image to look for landmarks (step 1022) and returns to step 1008.

If a determination is made that the landmark identified has not been visited, the process calculates a path plan to the landmark identified (step 1024). The process then marks the current position of an autonomous vehicle and estimated landmark position on the area coverage grid map of the worksite (step 1026). The process executes the path plan, marking the area coverage grid elements traversed as 'covered' (step 1028), and proceeds to step 1020.

Figure 11:
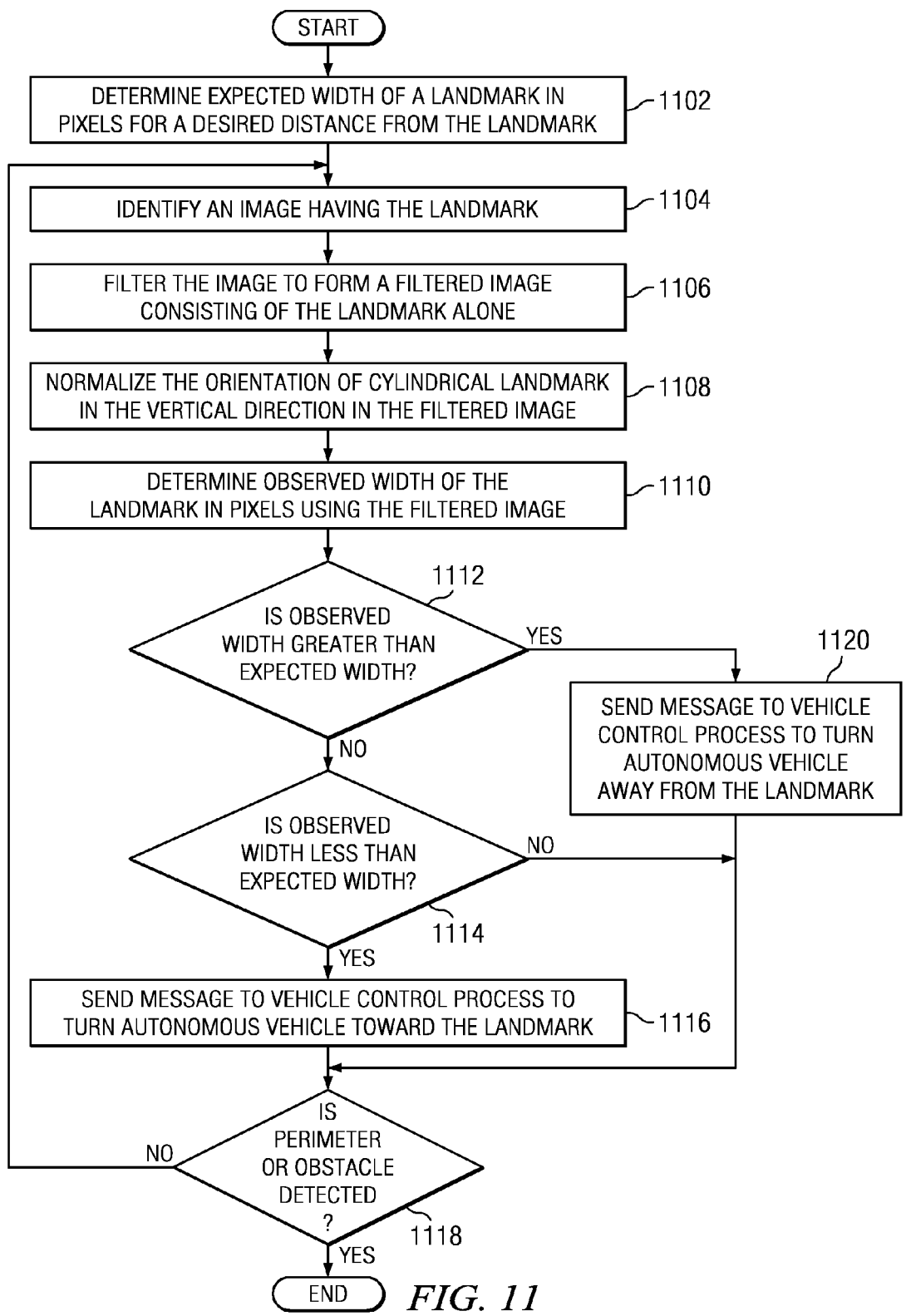
FIG. 11 is a flowchart illustrating a process for executing an area coverage path plan using sector decomposition in accordance with an illustrative embodiment.

With reference now to FIG. 11, a flowchart illustrating a process for executing an area coverage path plan using sector decomposition is depicted in accordance with an illustrative embodiment. The process in FIG. 11 may be implemented by a component such as navigation system 300 in FIG. 3, for example.

The process begins by determining an expected width of a landmark in pixels for a desired distance from the landmark (step 1102). The expected width may be the width of a landmark expected to be identified in an image of the landmark at a given distance from the landmark. The expected width may be geometrically calculated based on the camera image resolution for the number of cameras used to capture the image, the known width of the landmark identified in a landmark database, the target distance of the autonomous vehicle from the landmark, and the field of view for the number of cameras used to capture the image, for example. The process identifies an image having the landmark (step 1104). The image may be identified using a vision system, such as vision system 320 in FIG. 3, for example. The process filters the image to form a filtered image consisting of the landmark alone (step 1106). The image may be filtered to reduce pixel noise, for example. In one illustrative example, filtering may be accomplished optically using a polarized wavelength selective filter on number of cameras 322 of vision system 320, for example. In another illustrative example, wavelength selective filtering may be accomplished using software implemented in vision system 320. In yet another illustrative example, vision system 320 may filter number of images 324 in FIG. 3 by application of a median filter to remove pixel-level noise. The median filter may be a software process used by vision system 320 in this example.

The process optionally normalizes the orientation of cylindrical landmarks in the vertical direction in the filtered image (step 1108). The normalization of the image may be performed using vision system 320 and/or processor unit 302 of FIG. 3, for example. In an illustrative example, if a landmark is a cylinder, the image may be processed to identify the axis of the cylinder. The width is then calculated orthogonal to the axis identified, in this example.

The process determines the observed width of the landmark in pixels using the filtered image (step 1110). In an illustrative example, the observed width of the landmark may be calculated using a single cross section of a normalized landmark from step 1108. In another illustrative example, the observed width of the landmark may be calculated by taking an average of a number of cross sections of the landmark identified in the image. In an illustrative example where glare off a landmark is detected, the number of cross section widths which are significantly lower than the majority or plurality of cross section widths may be dropped from the width calculation.

The process then determines whether the observed width is greater than the expected width (step 1112). If a determination is made that the observed width is not greater than the expected width, the process determines whether the observed width is less than the expected width (step 1114). If a determination is made that the observed width is less than the expected width, the process sends a message to a vehicle control process to turn an autonomous vehicle toward the landmark (step 1116). If a determination is made that the observed width is not less than the expected width, the process determines whether a perimeter or obstacle is detected (step 1118).

If a determination is made that the observed width is greater than the expected width, the process sends a message to the vehicle control process to turn the autonomous vehicle away from the landmark (step 1120) and proceeds to step 1118.

If a determination is made that a perimeter or obstacle is not detected, the process returns to step 1104. If a determination is made that a perimeter or obstacle is detected, the process terminates thereafter.

Figure 12:
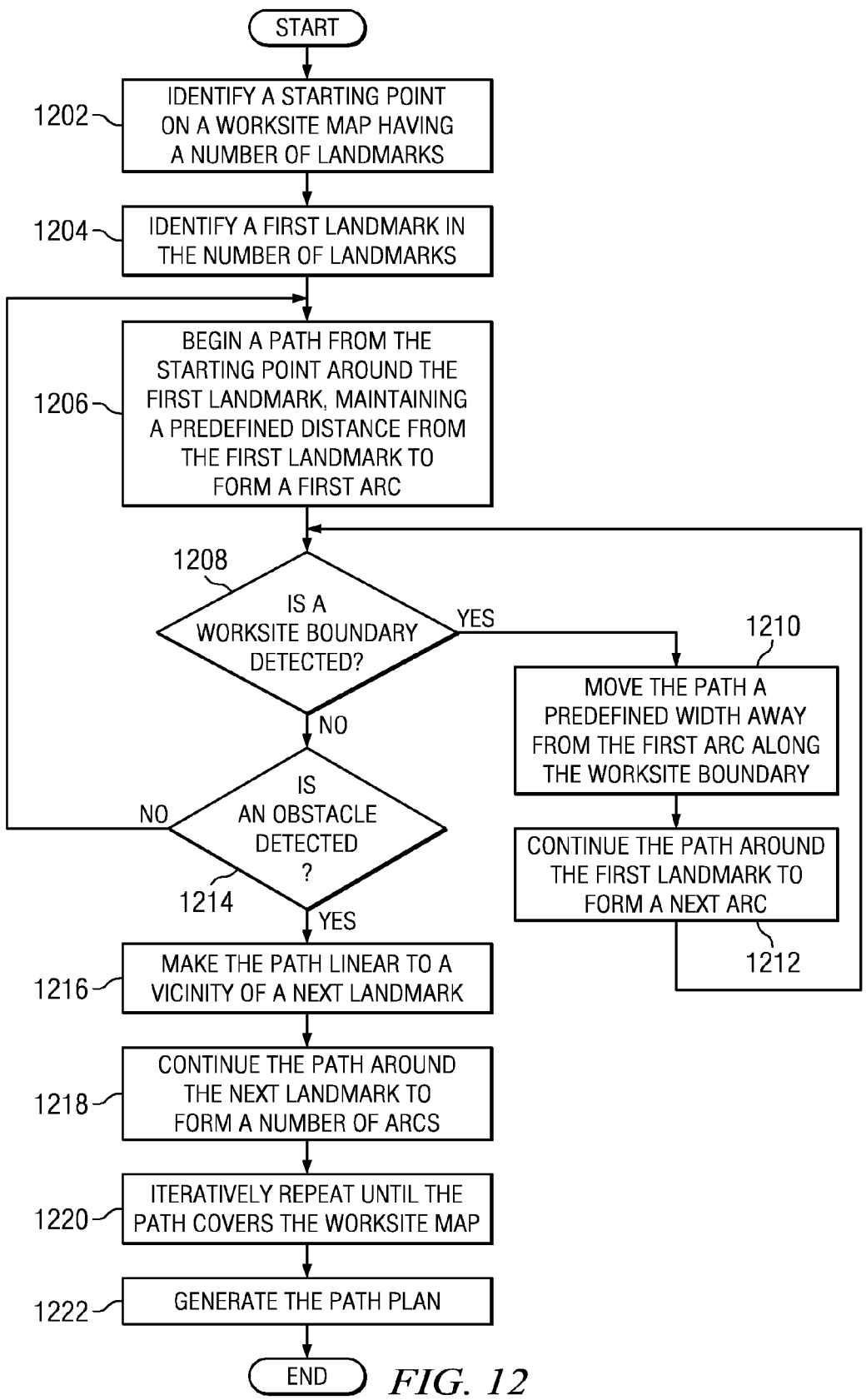
FIG. 12 is a flowchart illustrating a process for generating an area coverage path plan using sector decomposition in accordance with an illustrative embodiment.

With reference now to FIG. 12, a flowchart illustrating a process for generating an area coverage path plan using sector decomposition is depicted in accordance with an illustrative embodiment. The process in FIG. 12 may be implemented by a component such as navigation system 300 in FIG. 3, for example.

The process begins by identifying a starting point on a worksite map having a number of landmarks (step 1202). The process identifies a first landmark in the number of landmarks (step 1204). The process begins a path from the starting point around the first landmark, maintaining a predefined distance from the first landmark to form a first arc (step 1206). The process determines whether a worksite boundary is detected (step 1208).

If a determination is made that a worksite boundary is detected, the process moves the path a predefined width away from the first arc along the worksite boundary (step 1210). The process then continues the path around the first landmark to form a next arc (step 1212), before returning to step 1208.

If a determination is made that a worksite boundary is not detected, the process determines whether an obstacle is detected (step 1214). If a determination is made that no obstacle is detected, the process returns to step 1206. If a determination is made that an obstacle is detected, the process makes the path linear to a vicinity of a next landmark (step 1216). The process continues the path around the next landmark to form a number of arcs (step 1218). The process iteratively repeats until the path covers the worksite map (step 1220). The process then generates a path plan (step 1222), with the process terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for generating and executing an area coverage path plan, the method comprising:
   identifying, via a processor of an autonomous vehicle, a starting point on a worksite map having a number of landmarks;
   identifying, via the processor, a first landmark in the number of landmarks;
   generating, via the processor, a path around the first landmark until an obstacle is detected, wherein the path around the first landmark is a set of concentric arcs;
   responsive to detecting the obstacle by the autonomous vehicle, the processor making the path linear to a vicinity of a next landmark;
   generating, via the processor, the path around the next landmark, wherein the path around the next landmark is another set of concentric arcs; and
   sending control signals to a mobility system of the autonomous vehicle to move the autonomous vehicle according to the generated path to thereby execute the area coverage path plan by the autonomous vehicle.

2. The method of claim 1, wherein the path around the first landmark is a set of concentric arcs.

3. The method of claim 1, wherein generating the path around the first landmark further comprises:
   determining whether a first worksite boundary is detected;
   responsive to a determination that the first worksite boundary is detected, moving the path a predefined width away from the first landmark along the first worksite boundary; and
   continuing the path around the first landmark.

4. The method of claim 3, further comprising:
   responsive to a determination that the first worksite boundary is not detected, determining whether an obstacle is detected; and
   responsive to a determination that no obstacle is detected, continuing the path around the first landmark.

5. The method of claim 4, further comprising:
   iteratively generating the path around the number of landmarks until the path covers the worksite map; and
   generating a path plan using the path covering the worksite map.

6. An apparatus for generating an area coverage path plan, the apparatus comprising:
   a processor unit configured to generate an area coverage path plan for a worksite using a number of landmarks and a sector decomposition process that generates paths which follow arcs at predefined distances from the number of landmarks; and
   a vehicle control process configured to execute the area coverage path plan for the worksite received from the processor unit using a mobility system, wherein the processor unit is further configured to receive a worksite map for the worksite having the number of landmarks;
   generate an area coverage grid map having a number of area coverage grid elements for the worksite using the worksite map; generate a path plan for the worksite using the worksite map and the area coverage grid map; mark the number of landmarks on the worksite map as unvisited; and initialize the number of area coverage grid elements as uncovered.

7. The apparatus of claim 6, wherein the mobility system is further configured to perform an area coverage task at the worksite.

8. The apparatus of claim 6, wherein the worksite map includes at least one of a number of landmark locations, a number of landmark attributes, and a number of obstacles.

9. The apparatus of claim 6, wherein the processor unit is further configured to identify a landmark marked as unvisited on the worksite map; and send a message to the vehicle control process to proceed to a vicinity of the landmark marked as unvisited.

10. The apparatus of claim 6, wherein the processor unit is further configured to
    determine whether an obstacle is detected; responsive to a determination that the obstacle is detected, mark the landmark marked as unvisited as visited on the worksite map; and mark associated area coverage grid elements of the landmark marked as visited as covered.

11. The apparatus of claim 6, wherein the processor unit is further configured to determine whether there are any remaining landmarks marked as unvisited; responsive to a determination that there are remaining landmarks marked as unvisited, identify a next landmark marked as unvisited on the worksite map; and send a message to the vehicle control process to proceed to a vicinity of the next landmark marked as unvisited.

12. The apparatus of claim 6, wherein the processor unit is further configured to, responsive to a determination that there are no remaining landmarks marked as unvisited, determine whether there are any remaining area coverage grid elements marked as uncovered; responsive to a determination that there are remaining area coverage grid elements marked as uncovered, send a message to the vehicle control process to proceed along the path plan to a visited landmark associated with an area coverage grid element marked as uncovered; and execute an area coverage behavior on a path around the visited landmark.

13. The apparatus of claim 6, further comprising:
    a vision system configured to capture a number of images of the worksite.

* * * * *